(12) United States Patent  (10) Patent No.: US 8,365,424 B2
Laabs et al.  (45) Date of Patent: Feb. 5, 2013

(54) MOTOR DRIVE APPARATUS AND CONTROL METHOD FOR A SURVEYING INSTRUMENT

(75) Inventors: Steffen Laabs, Jena (DE); Bernd Donath, Jena (DE); Andreas Pruvost, Bretleben (DE); Matthias Nowak, Jena (DE); Mario Fischer, Saalfelder Hohe (DE)

(73) Assignee: Trimble Jena GmbH, Jena (DE)

( * ) Notice: Subject to any disclaimer, the term of this patent is extended or adjusted under 35 U.S.C. 154(b) by 422 days.

(21) Appl. No.: 12/645,028

(22) Filed: Dec. 22, 2009

(65) Prior Publication Data

US 2010/0180456 A1  Jul. 22, 2010

(30) Foreign Application Priority Data

Jan. 21, 2009 (DE) .......................... 10 2009 000 350

(51) Int. Cl.
*G01C 5/00* (2006.01)
*G01C 17/00* (2006.01)
(52) U.S. Cl. ........................................... 33/281; 33/290
(58) Field of Classification Search ............... 33/290, 33/291, 292, 281, 285, 286
See application file for complete search history.

(56) References Cited

U.S. PATENT DOCUMENTS

| | | | |
|---|---|---|---|
| 2,613,050 A | 10/1952 | Esval | |
| 4,093,383 A | 6/1978 | Fiest et al. | |
| 4,351,187 A | 9/1982 | Foulks et al. | |
| 5,331,490 A | 7/1994 | Richards et al. | |
| 5,421,096 A | 6/1995 | Ross | |
| 5,475,930 A | 12/1995 | Kimura | |
| 5,485,266 A * | 1/1996 | Hirano et al. | 356/249 |
| 5,636,018 A * | 6/1997 | Hirano et al. | 356/248 |
| 5,784,155 A * | 7/1998 | Ohtomo et al. | 356/141.1 |
| 5,898,490 A * | 4/1999 | Ohtomo et al. | 356/141.3 |
| 5,946,087 A * | 8/1999 | Kasori et al. | 356/249 |
| 5,987,763 A | 11/1999 | Ammann et al. | |
| 6,046,557 A * | 4/2000 | Godo | 318/257 |
| 6,075,586 A * | 6/2000 | Ohtomo et al. | 356/4.08 |
| 6,076,266 A | 6/2000 | Beckingham et al. | |
| 6,688,011 B2 * | 2/2004 | Gamal et al. | 33/290 |
| 6,871,408 B2 * | 3/2005 | Malard et al. | 33/286 |
| 7,059,058 B2 * | 6/2006 | Kousek et al. | 33/290 |
| 7,634,381 B2 * | 12/2009 | Westermark et al. | 702/151 |
| 2003/0229997 A1* | 12/2003 | Gamal et al. | 33/290 |
| 2008/0297760 A1 | 12/2008 | Herbst et al. | |
| 2009/0133273 A1* | 5/2009 | Westermark et al. | 33/281 |

FOREIGN PATENT DOCUMENTS

| | | |
|---|---|---|
| DE | 635 645 A | 9/1936 |
| DE | 679 911 A | 8/1939 |
| DE | 919 331 A | 10/1954 |
| DE | 758 308 A | 8/1956 |
| DE | 1 202013 | 9/1965 |

(Continued)

*Primary Examiner* — Yaritza Guadalupe-McCall
(74) *Attorney, Agent, or Firm* — Kilpatrick Townsend & Stockton LLP

(57) ABSTRACT

A motor drive apparatus for a surveying instrument and a control method for controlling a surveying instrument enables a fast rotation of an instrument axis with high angular resolution. The motor drive apparatus for a surveying instrument includes a first motor for rotating an instrument axis. The first motor includes a stator and a rotor having a rotation axis and a plurality of step positions relative to the stator. The motor drive apparatus also includes a mounting unit for mounting the first motor so as to be pivotable around the rotation axis and an adjusting unit for rotating the stator of the first motor around the rotation axis.

26 Claims, 12 Drawing Sheets

FOREIGN PATENT DOCUMENTS

| | | |
|---|---|---|
| DE | 26 48 592 A1 | 7/1977 |
| DE | 31 36431 A1 | 5/1982 |
| DE | 39 09 206 C1 | 5/1990 |
| DE | 295 03 919 U1 | 4/1995 |
| DE | 196 15 515 C1 | 3/1997 |
| DE | 698 09 873 T2 | 10/2003 |
| EP | 0 304 262 B1 | 2/1989 |
| EP | 0 388 898 A1 | 9/1990 |
| EP | 1 245 924 A2 | 10/2002 |
| EP | 1 619 468 A1 | 1/2006 |
| EP | 0 989 385 B1 | 6/2006 |
| JP | 11-310657 A | 11/1999 |
| JP | 2002-310657 A | 10/2002 |
| JP | 2007-016971 A | 1/2007 |
| JP | 2008-224527 A | 9/2008 |
| WO | WO 2004/008263 A | 1/2004 |
| WO | WO 2004/097338 A | 11/2004 |

* cited by examiner

MOTOR DRIVE APPARATUS AND CONTROL METHOD FOR A SURVEYING INSTRUMENT

CROSS-REFERENCES TO RELATED APPLICATIONS

The present application claims priority to German Patent Application No. 10 2009 000 350.9, filed Jan. 21, 2009, entitled "Motor drive apparatus and control method for a surveying instrument," the contents of which is hereby incorporated by reference in its entirety.

BACKGROUND OF THE INVENTION

The present invention relates to a motor drive apparatus for a surveying instrument and a control method for controlling a surveying instrument, and in particular to a motor drive apparatus and a control method to rotate an instrument axis of the surveying instrument.

In surveying, various kinds of surveying instruments, such as tacheometers, theodolites or total stations, are commonly used for measuring distances and/or angles of objects. Conventionally, these surveying instruments comprise a base having a stand to stably position the surveying instrument on the ground and a head that may be moved with respect to the base. The head generally comprises an optical device, such as a ranging device or sighting device for sighting or focusing on an object, for instance a lens, telescope, camera or the like. In particular, in order for the head to be positionable so as to sight an object, it has to be rotatable in space, preferably in vertical and horizontal direction.

The movable or rotatable head may comprise a ranging device or sighting device for targeting a remote object to determine the location of the remote object. Different kinds of gears are known for rotating the head relative to the base in a horizontal plane, wherein, for example, the ranging device of the head may be provided on a gimbaled yoke to be also movable in vertical direction.

In surveying instruments, such as geodesic-measuring instruments, the rotation of the head may be effected by using a motor, such as DC gear motors so that the head may be adjusted relative to the base.

While it is preferred to rotate the head in short time, it is even more important to provide high accuracy when adjusting a specific angle, wherein the accuracy of angular resolution is preferable below 1", i.e. fast and highly precise adjusting of an angle is desired.

Existing solutions provide a friction clutch for supporting switching between two operations, namely a first operation, in which the head may be moved manually and quickly and a second operation, in which the head may be moved finely by manually turning a knob, when the clutch is engaged.

SUMMARY OF THE INVENTION

There is a need for a motor drive apparatus for a surveying instrument and a control method for controlling a surveying instrument enabling a fast rotation of an instrument axis with high angular resolution.

According to an embodiment, a motor drive apparatus for a surveying instrument comprises a first motor for rotating an instrument axis, the first motor including a stator and a rotor having a rotation axis and a plurality of step positions relative to the stator; a mounting unit for mounting the first motor so as to be pivotable around the rotation axis; and an adjusting unit for rotating the stator of the first motor around the rotation axis. Accordingly, a motorized apparatus for automatic and fast rotating an instrument axis of a surveying instrument is provided that is capable of achieving high angular resolution.

In another embodiment of the invention, the adjusting unit comprises a lever coupled to the stator so that a movement of the lever translates into a rotation of the stator. Accordingly, the adjusting unit may finely rotate the first motor as a whole.

In another embodiment of the invention, the adjusting unit comprises an actuator for applying a torque to the stator. Accordingly, the actuator may finely rotate the first motor so that the instrument axis of the surveying instrument coupled to the first motor may be rotated by a small angle.

In another embodiment of the invention, the adjusting unit comprises one of a spindle drive and a worm gear for coupling the actuator and the lever to move the lever. Accordingly, different mechanisms may be used to manually or automatically adjust a rotation angle of the instrument axis.

In another embodiment of the invention, the actuator comprises a second motor. Accordingly, the adjusting unit may be motorized to automatically perform a rotation by a small angle of the instrument axis.

In another embodiment of the invention, the second motor comprises a second stator and a second rotor and the second rotor has a plurality of step positions relative to the second stator. Accordingly, the rotor of the second motor may be moved incrementally from one step position to another relative to the stator of the second motor and a small increment may translate in yet a smaller increment at the first motor.

In another embodiment of the invention, the adjusting unit comprises one of a threaded spindle and a worm extending in axial direction coinciding with the rotation axis of the second motor. Accordingly, by rotation of the rotor of the second motor, the rotation of the threaded spindle or worm may translate into a movement in the axial direction of the lever.

In another embodiment of the invention, at least one of the first motor and the second motor is constituted by a stepper motor providing a holding torque between the rotor and the stator. Accordingly, a cheap and simple stepper motor instead of an expensive DC-servo motor with attached gear may be provided, and a movement of a stator may be translated into a rotation of the rotor of the same motor due to the holding torque. Further, a stepper motor may reduce the power consumption of a motor drive apparatus.

In another embodiment of the invention, the motor drive apparatus further comprises a gear wheel coupled to the first motor for rotating the instrument axis by rotation of the first motor around the rotation axis. Accordingly, a high gear ratio may be chosen to effect a fine rotation of the instrument axis by rotation of the rotation axis of the first motor due to the rotation of the rotor of the first motor or the combination rotor and stator.

In another embodiment of the invention, the motor drive apparatus comprises a spring coupling the mounting unit and the adjusting unit. Accordingly, the lever of the adjusting unit may be stably moved without play.

In another embodiment of the invention, the motor drive apparatus further comprises a magnet attached to the lever to apply a breaking force to the first motor to lock the first motor to the lever. Accordingly, a movement of the lever directly translates into a rotation of the rotation axis of the first motor.

In another embodiment of the invention, the magnet is a bistable magnet and the breaking force is applied mechanically by an anchor of the bistable magnet. Accordingly, the magnet and anchor arrangement may assume two states, a locked state in which the anchor extends out of the magnet to apply a breaking force and an unlocked state in which a breaking force is not applied. Further, a bistable magnet may save power compared to other magnets.

In another embodiment of the invention, the motor drive apparatus further comprises a position detector for detecting the position of the lever. Accordingly, displacement of the lever can be tracked so that it can be detected when the lever reaches its displacement limits.

In another embodiment of the invention, a motor drive apparatus comprises a control unit adapted to drive the first motor and the adjusting unit. Accordingly, control of the motor drive apparatus may be performed automatically with appropriate timings.

In another embodiment of the invention, the control unit is adapted to drive the first motor in a coarse mode by rotating the rotor relative to the stator to adjust a coarse angle of the instrument axis and to drive the adjusting unit in a fine mode by rotating the stator around the rotation axis to adjust a fine angle of the instrument axis. Accordingly, two modes are provided to firstly quickly rotate the instrument axis to an approximate position and then secondly finely adjust the position.

In another embodiment of the invention, the control unit is adapted to first drive the first motor to rotate the rotor by a first angle to a first position to adjust the coarse angle of the instrument axis and then to drive the adjusting unit to rotate the stator of the first motor by a second angle to a second position to adjust the fine angle of the instrument axis, wherein the first angle is larger than the second angle. Accordingly, a fast rotation with high angular resolution may be achieved.

In another embodiment of the invention, a surveying instrument is provided comprising the above described motor drive apparatus for rotating the instrument axis of the surveying instrument. Accordingly, the above described advantages can be utilized in a surveying instrument.

In another embodiment of the invention, a surveying instrument is provided comprising two motor drive apparatuses described above, wherein the first motor drive apparatus is adapted to rotate a horizontal instrument axis and the second motor drive apparatus is adapted to rotate a vertical instrument axis. Accordingly, the above described advantages may be utilized in the surveying instrument for adjusting the surveying direction in three dimensional space.

In another embodiment of the invention, a control method for controlling a surveying instrument comprises rotating an instrument axis of the surveying instrument by a first motor, the first motor being mounted so as to be pivotable around a rotation axis and including a stator and a rotor having the rotation axis and a plurality of step positions relative to the stator to adjust a coarse angle of the instrument axis; and rotating the stator of the first motor around the rotation axis by an adjusting unit to adjust a fine angle of the instrument axis. Accordingly, an instrument axis of a surveying instrument may be quickly rotated with high angular resolution.

In another embodiment of the invention, rotating the instrument axis comprises rotating the rotor relative to the stator in a coarse mode to adjust the coarse angle of the instrument axis, and rotating the stator around the rotation axis is performed in a fine mode to adjust the fine angle of the instrument axis. Accordingly, a quick coarse adjustment of the instrument axis and a fine adjustment may be performed.

In another embodiment of the invention, in the coarse mode, the rotor of the motor is first rotated by a first angle to a first position and then, in the fine mode, the stator of the motor is rotated by a second angle to a second position, wherein the first angle is larger than the second angle. Accordingly, the instrument axis may be rotated quickly with high angular resolution.

In another embodiment of the invention, when the rotor of the first motor is rotated to a second position, the stator is rotated in a reverse direction to a third position. Accordingly, coarse and fine mode can be controlled separately or combined, and the adjusting unit may displace the lever so as to be positioned in a middle position with respect to its displacement limits and the rotor of the first motor may be rotated in reverse direction.

In another embodiment of the invention, in the fine mode, the rotor and the stator of the first motor are kept in the same position relative to each other. Accordingly, a rotation of the stator is translated into a rotation of the rotor.

In another embodiment of the invention, a program may be provided including instructions adapted to cause data processing means to carry out a method for the above features.

In another embodiment of the invention, a computer readable medium may be provided in which a program is embodied where the program is to make a computer execute the method with the above features.

In another embodiment of the invention, a computer program product may be provided, comprising the computer readable medium.

Further advantageous features of the invention are disclosed in the claims.

BRIEF DESCRIPTION OF THE DRAWINGS

FIG. 1b illustrates examples of elements of the motor drive apparatus of FIG. 1a;

DETAILED DESCRIPTION OF SPECIFIC EMBODIMENTS

Preferred embodiments are described with reference to the figures. It is noted that the following description contains examples only and should not be construed as limiting the invention.

Embodiments generally relate to a motor drive apparatus for a surveying instrument having a first motor including a stator and a rotor having a plurality of step positions relative to the stator. In an embodiment the first motor is mounted to a mounting unit so as to be pivotable around the rotation axis of the rotor. The apparatus also comprises an adjusting unit for rotating the pivotably mounted stator of the first motor. The first motor is preferably used in a coarse mode, i.e. the rotor of the first motor may quickly rotate to adjust a coarse angle of an instrument axis limited by the size of step positions of the rotor and the adjusting unit is preferably operated in a fine mode, coupled to the first motor so that the stator of the first motor can be rotated finely. Therefore, a slight rotation of the instrument axis can be effected, since the rotating stator of the first motor may also effect a rotation in the rotor.

In other words, in this embodiment the first motor is arranged to turn the instrument axis with high angular velocity, whereas the accuracy of the angular positioning of the rotor is determined by the step positions of the rotor relative to the stator, which however may not be sufficient for surveying applications. Since the first motor, in particular the stator, is pivotable around the rotation axis of the motor, the adjusting unit can be coupled to the motor, in particular the stator, to rotate the stator to a degree smaller than a step position so that fine adjustment of the instrument axis may be achieved that is sufficient for surveying applications.

Figure 1A:
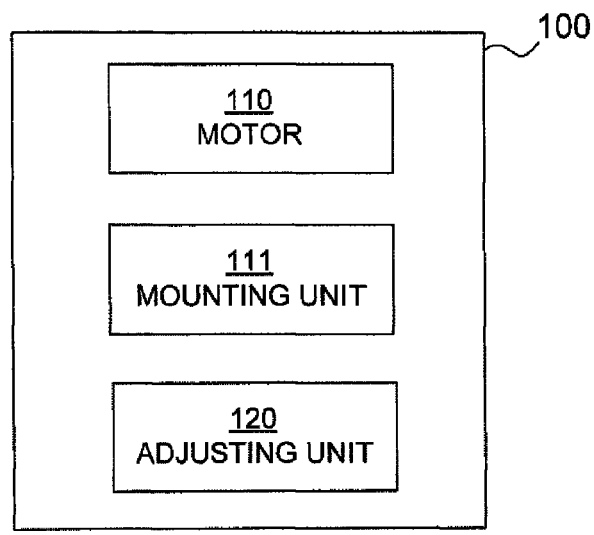
FIG. 1a illustrates elements of a motor drive apparatus according to an embodiment of the invention.

FIG. 1a illustrates elements of a motor drive apparatus 100 according to another embodiment, comprising a motor 110, a mounting unit 111 and an adjusting unit 120.

The motor drive apparatus 100, which may be used in a surveying instrument to change the direction of an optical arrangement, such as a telescope or laser for sighting and measuring an object, comprises the motor 110 for rotating an instrument axis, such as the instrument axis of the surveying instrument. The motor 110 includes a stator and a rotor having a rotation axis, around which the stator may rotate, and a plurality of step positions relative to the stator.

In more detail, the instrument axis is coupled to the rotor of the motor 110 so that a rotation of the rotor translates into a rotation of the instrument axis, wherein the amount of rotation may be controlled by a gear arrangement placed between the rotor and the instrument axis. For example, the motor with a plurality of step positions may be a stepper motor, which provides small discrete steps when the rotor is rotated relative to the stator.

The motor 110 is mounted to a mounting unit 111, which may be a frame or housing of the motor drive apparatus, so that the motor is pivotable around the rotation axis, i.e. the stator and the rotor may rotate around the same axis.

The adjusting unit 120 is configured to rotate the stator of the motor around the rotation axis so that the instrument axis may be rotated either directly, if the rotor directly follows the movement of the stator, which is for example the case in stepper motors providing a holding torque between stator and rotor, or indirectly, after the motor is energized and rotor follows the rotation of the stator due to induction effects. For example, there may be motors, in which the rotor only follows a movement of the stator when the motor is energized.

In other words, the rotor is adapted to effect rotation of the instrument axis by rotation of the rotor relative to the stator, which is the usual electromotor operation, and also by rotation of the stator, wherein this rotation rotates the whole motor comprising the stator and the rotor and thus also leads to a rotation of the instrument axis.

In detail, the adjusting unit 120 may comprise an arm or lever to be coupled to the stator and may comprise any kind of actuator for applying a torque to the stator via the arm or lever to effect rotation. The actuator may constitute, a second motor, such as a stepper motor, or a piezo-electric transducer or the like.

Figure 1B:
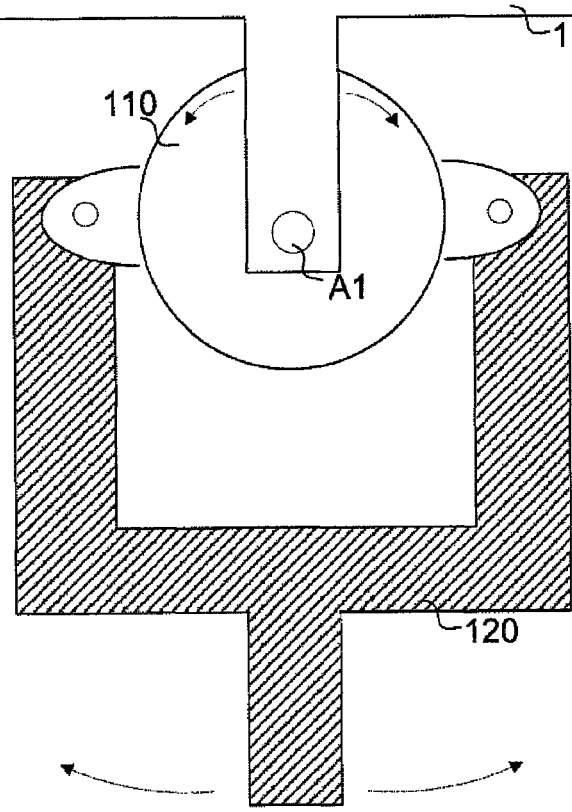

FIG. 1b illustrates an example of the basic arrangement of elements of the motor drive apparatus of FIG. 1a. In FIG. 1b the first motor 110 is pivotably mounted by means of the mounting unit 111. The mounting unit may form part of the frame of the motor drive apparatus and allows a rotation of the entire motor 110 around the rotation axis A1, e.g. holding the first motor at the motor shaft. Moreover, the adjusting unit 120, e.g. a lever, is fixed to the stator of the first motor 110 so that the entire motor 110 is rotated around the rotation axis A1 when moving the adjusting unit, e.g. in the figure at the lower end to the left or right.

In the following, a more detailed example of a motor drive apparatus is presented with respect to FIG. 2.

Figure 2:
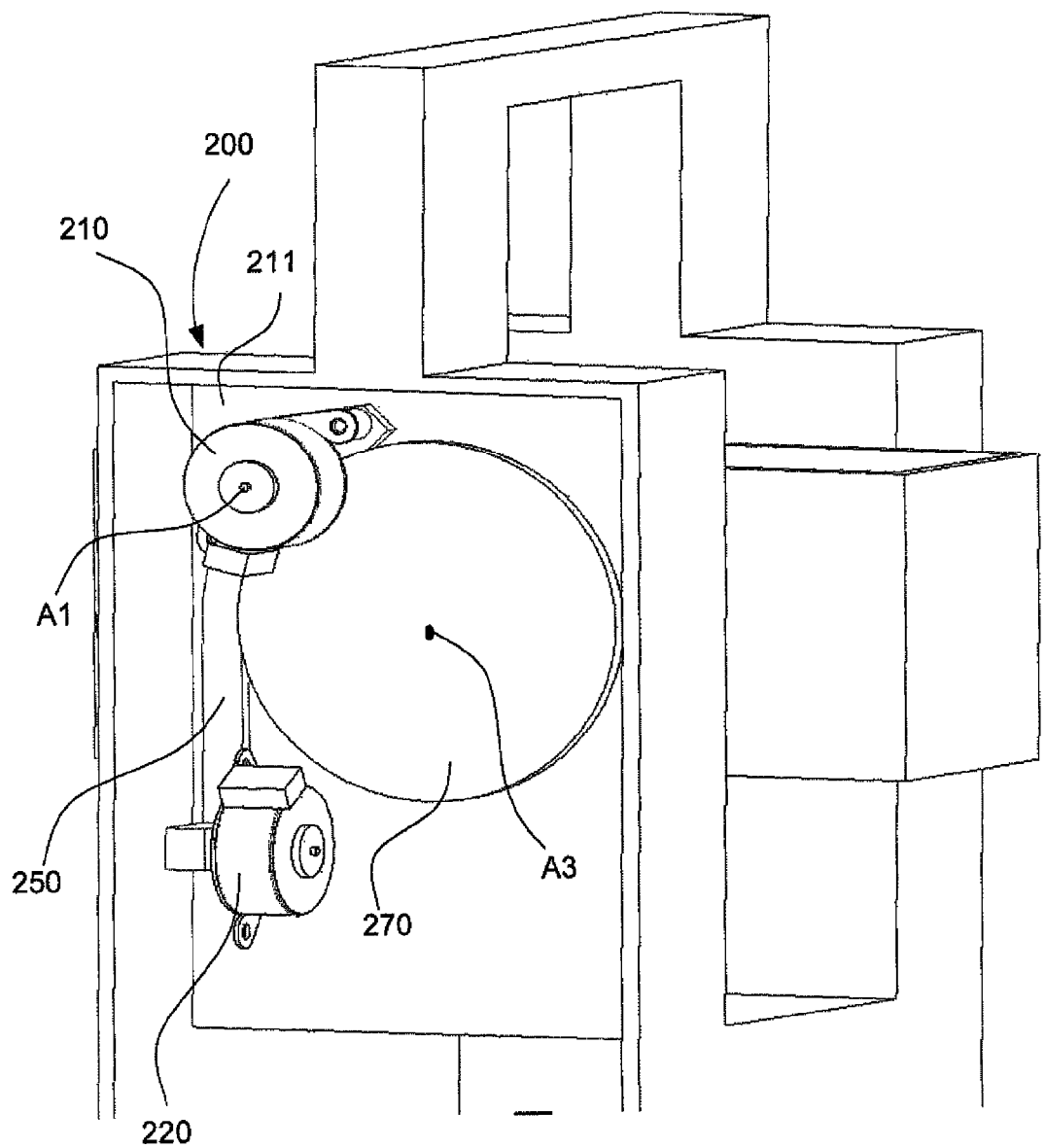
FIG. 2 illustrates a schematic view of a motor drive apparatus according to another embodiment of the invention.

FIG. 2 illustrates a schematic view of a motor drive apparatus 200 according to another embodiment.

The motor drive apparatus in FIG. 2 comprises a first motor 210 having a rotation axis A1, a mounting unit 211, a second motor 220, a lever 250 and a gear wheel 270 with the instrument axis A3 essentially positioned in its center. The first motor 210 and mounting unit 211 basically correspond to the motor 110 and mounting unit 111 of FIG. 1a.

In short, the second motor 220 causes the lever 250 to be moved to the left in the figure as indicated by the lower arrow. When the lower part of the lever 250 is pushed outward (to the left in the figure), the lever 250 rotates around the rotation axis A1 (clockwise in the figure) and, since the lever is attached to the stator of the first motor (see bolt 415 in FIG. 4), also the stator of the first motor 210 rotates around the rotation axis A1 (also clockwise in the figure as shown by the arrow).

In detail, as can be seen in FIG. 2, the first motor 210 is in contact with the mounting unit 211 and engages with the gear wheel 270. In a first coarse mode, the rotor of the first motor 210 rotates and thereby turns the gear wheel 270 so that the instrument axis A3 is rotated.

Further, it can be seen in FIG. 2 that the second motor 220 which is not limited to a motor but may be any kind of actuator, is coupled to the first motor 210 via the lever 250. The lever 250 may be any kind of arm essentially providing means to apply a torque to the stator of the first motor 210. Therefore, the lever 250 and the second motor 220 may be regarded as constituting an adjusting unit, such as the adjusting unit 120 described in FIG. 1a.

In more detail, the lever 250 may be coupled to the stator of the first motor 210 so that a movement of the lever translates into a rotation of the stator. The lever may also be pivotably mounted so as to be rotatable by a small angle with respect to the rotation axis A1, e.g. the rotation axis of the lever may coincide with the rotation axis of the first motor leading to a high transmission ratio for finely turning the stator of the first motor by the lever, which will be described in more detail below. Alternatively, the rotation axis of the lever 250 may be different from the rotation axis A1 and may be offset from rotation axis A1, e.g. coinciding with the instrument axis.

For example, if a stepper motor is used as the first motor 210, in the fine mode, the stepper motor is clamped by its own stepper motor friction, when the power is switched off, or held by power supplied to stepper motor. In other words, a stepper motor may provide a holding torque between the rotor and the stator. Therefore, rotation of the stator of the first motor 210 translates into a rotation of the gear wheel 270 which is coupled to the rotor of the first motor 210 directly or by means of an intermediate gear wheel or gear arrangement for rotating the instrument axis by rotation of the first motor around the rotation axis.

Similar to the first motor 210, also the second motor 220 may comprise a second stator and a second rotor, whereas the second rotor may have a plurality of step positions relative to the second stator so that a rotation of the rotor with respect to a fixed second stator may be performed in steps incrementally. A specific example of a second motor including a second stator and a second rotor is a stepper motor, such as the one described above.

It is appreciated by the skilled person that although the motor drive apparatus 200 has been described with respect to a second motor 220 and a gear wheel 270, the motor drive apparatus is not limited thereto and instead of the second motor 220 any type of actuator may be used for applying a torque to the stator of the first motor 210. Similarly, the gear wheel 270 may be replaced by any suitable gear arrangement or spur gear so that the first motor rotates the instrument axis. It is even feasible that the instrument axis is directly rotated by the rotor of the first motor, e.g. if the instrument axis A3 coincides with the rotation axis A1.

The instrument axis A3 in FIG. 2 is basically shown as a horizontal axis to rotate a part attached to it, such as a head of a surveying instrument, up and down in vertical direction. However, it is appreciated that the motor drive apparatus 200 shown in FIG. 2 may be simply rotated by 90 degrees so that it may also cover the perpendicular direction thereto not shown in FIG. 2.

Next, operations for controlling a surveying instrument, and in particular a motor drive apparatus of a surveying instrument, will be described with respect to FIG. 3.

Figure 3:
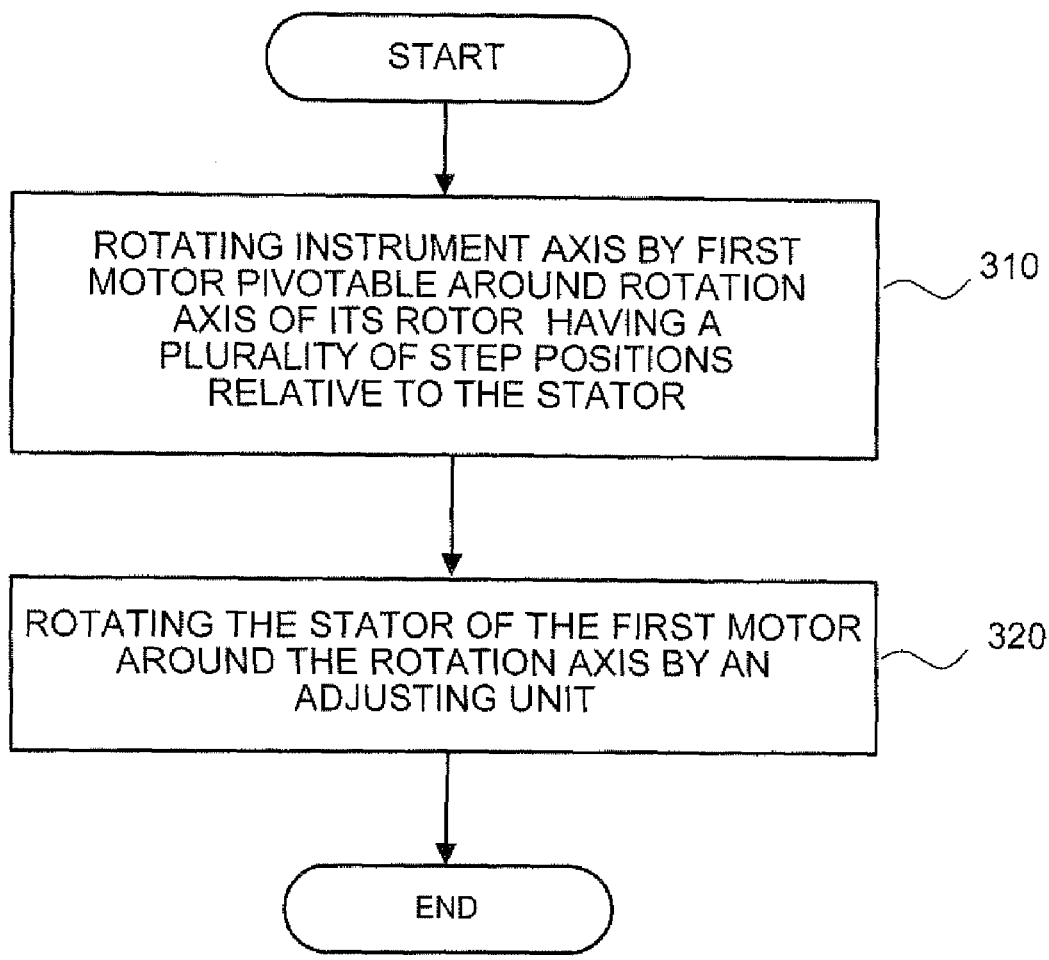
FIG. 3 illustrates operations of a control method for controlling a surveying instrument according to another embodiment of the invention.

FIG. 3 illustrates a flow diagram of operations of a control method for controlling a motor drive apparatus of a surveying instrument, such as a surveying instrument comprising the motor drive apparatus 100 or 200.

In a first operation 310, the instrument axis is rotated by the first motor which is mounted so as to be pivotable around the rotation axis of the rotor having a plurality of step positions relative to the stator to adjust a coarse angle of the instrument axis.

In a second operation 320, the stator of the first motor is rotated around the rotation axis by the previously described adjusting unit, e.g. an actuator with a lever, to adjust a fine angle of the instrument axis.

Specifically, rotating the instrument axis may comprise rotating the rotor relative to the stator of the first motor in a coarse mode to adjust the coarse angle of the instrument axis. Further, the stator may be rotated around the rotation axis, in a fine mode operation, to adjust the fine angle of the instrument axis.

In case a stepper motor is used as the first motor and another second stepper motor is used in the adjusting unit, in the coarse mode only the first stepper motor is working and the second stepper motor can be switched off. Then, in the fine mode, the first stepper motor is clamped, for example, by its own stepper motor friction and the second stepper motor is moving the lever. The lever then turns the whole first stepper motor in respect to its own motor axis, which may be seen in more detail in FIG. 4. Therefore, in the coarse mode, the rotor of the first motor may be first rotated by a first angle to a first position and then, in the fine mode, the stator of the first motor may be rotated by a second angle to a second position, wherein the first angle is preferably larger than the second angle.

In the following, the motor drive apparatus according to a more detailed embodiment will be described with respect to FIG. 4.

Figure 4:
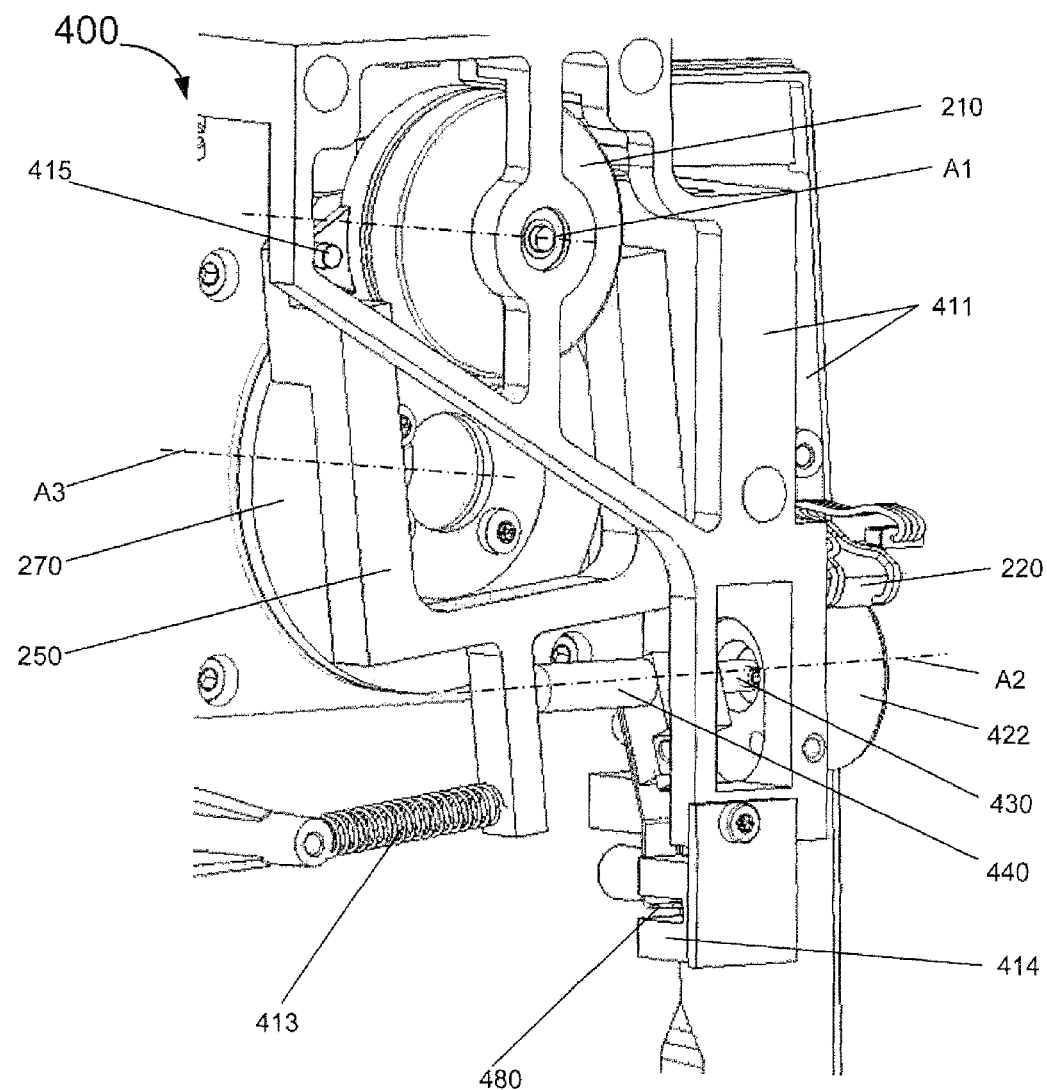
FIG. 4 illustrates a detailed perspective view of a motor drive apparatus according to another embodiment of the invention.

FIG. 4 illustrates a detailed perspective view of the motor drive apparatus 400. The individual elements of the motor drive apparatus, their relative position to each other, their functions and their interactions will be described with respect to FIG. 4 below. At the same time, reference will be made to FIGS. 5 and 6 illustrating cross sectional views of the motor drive apparatus 400 of FIG. 4 so that the individual elements may be seen from different directions for a better understanding of their positions and functions.

Figure 5:
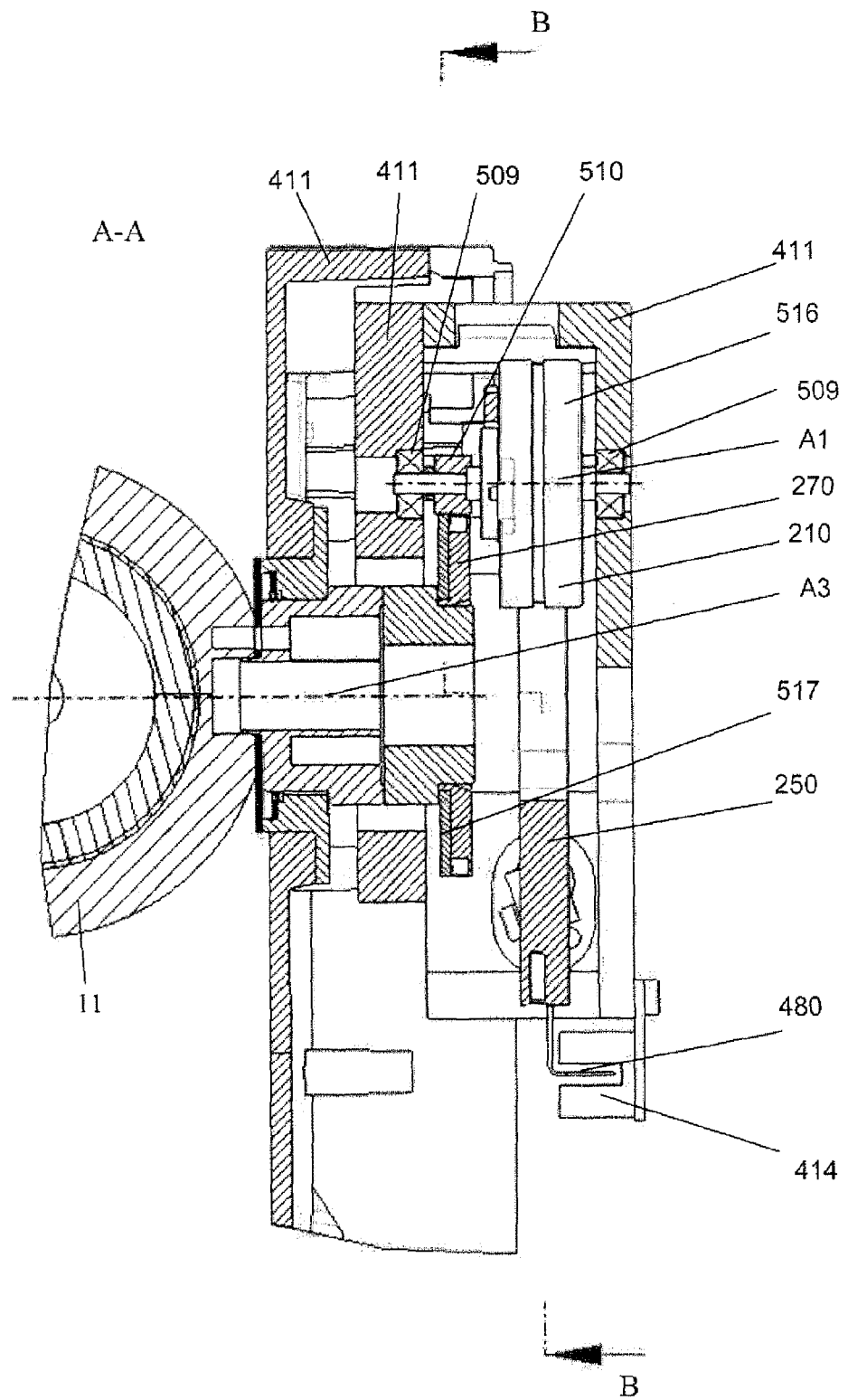
FIG. 5 illustrates a cross-sectional view taken along a plane parallel to the instrument axis and rotation axis of the motor drive apparatus of FIG. 4.
Figure 6:
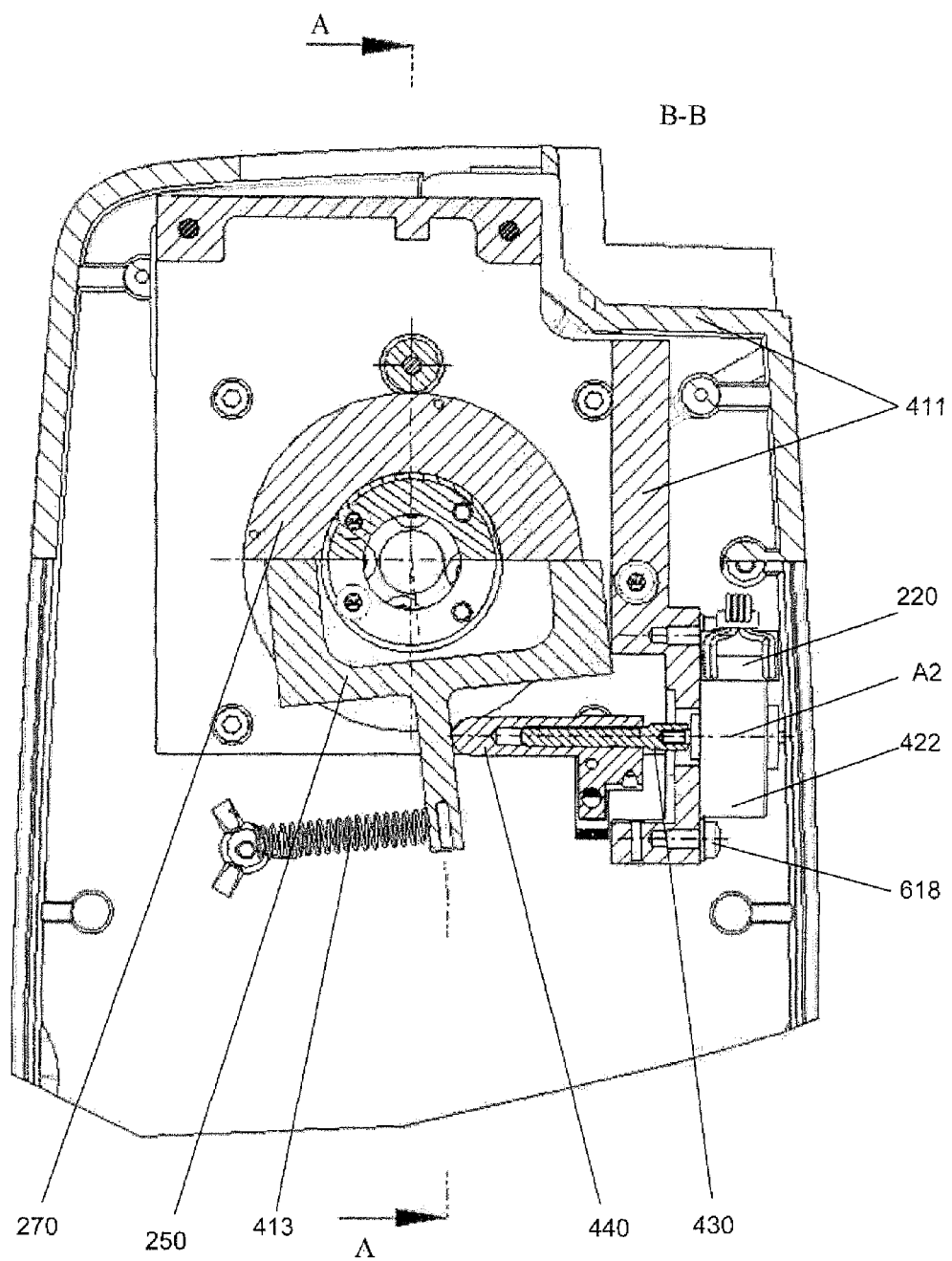
FIG. 6 illustrates a cross-sectional view taken along a plane perpendicular to the instrument axis and the rotation axis of the motor drive apparatus of FIG. 4.

In particular, FIG. 5 illustrates a cross-sectional view taken along a plane parallel to the instrument axis A3 and rotation axis A1 and FIG. 6 illustrates a cross-sectional view taken along a plane perpendicular to the instrument axis A3 and the rotation axis A1 of the motor drive apparatus of FIG. 4.

In the following, similar or the same reference signs denote similar or the same elements and a detailed description thereof will be omitted to avoid unnecessary repetition.

In addition to the previously described elements of the motor drive apparatus 100, 200, namely the motor 210, the mounting unit 211, the second motor 220, the lever 250 and the gear wheel 270, the motor drive apparatus 400 comprises several other elements, which will be described in detail below.

FIG. 4 illustrates the motor drive apparatus 400 usable for coarse and fine adjustments of an instrument axis A3 of a surveying instrument, as discussed above. The individual elements of the apparatus are attached to a mounting unit, which is illustrated as a frame 411 in FIG. 4. The instrument axis A3, which is to be rotated, and the rotor axis corresponding to the rotation axis A1 of the first motor 210 are parallel and arranged with a predetermined distance. The first motor 210 and the second motor 220 comprise a stator and rotor, as commonly known in the art, wherein the rotor is fixed to the rotor axis.

Similar to FIG. 2, the lever 250 in FIG. 4 is also shown with hatching. The lever 250 can be moved by the second motor 220 in the direction of the rotation axis of the second motor 220 which is indicated in FIG. 4 by the lower arrow. Once the lever 250 is moved, for example left/right in FIG. 4, the stator of the first motor 210 attached to the lever (bolt 415) rotates clockwise/counterclockwise.

Specifically, the instrument axis A3 is driven by the gear wheel 270, which is coupled to the rotor of the first motor 210. The first motor 210 is arranged pivotably in the frame 411 so as to be rotatable around its own rotation axis A1. The rotation axis of the first motor 210, preferably a stepper motor, is attached to a pinion gear 510, which is shown in the cross-sectional view of FIG. 5. The pinion gear 510 can transmit the rotary motion of the rotor of the first motor 210 to the gear wheel 270, and via the gear wheel 270 the rotary motion may be imparted to the instrument axis A3, which is attached thereto.

The lever 250 is fixed to the stator 516 of the first motor 210 by screws or bolts 415, which is shown in FIGS. 4 and 5. The lever 250 can be turned around the rotation axis A1 by a finite angle. The other end of the lever 250 is coupled to the second motor 220, which is also attached to the frame 411 and arranged so that its stator 422 is fixed with respect to rotation around the rotor axis A2 of the second motor 220.

Coupling between the second motor and the lever is achieved in the example of FIGS. 4 to 6 by a spindle drive comprising a threaded spindle 430 and a spindle nut 440. The threaded spindle 430 is secured to the rotor axis of the second motor 220, preferably a stepper motor, or may be identical to it, i.e. the rotor may be in the form of a spindle. By means of the threaded spindle 430 and the spindle nut 440 the rotary motion of the second motor 220 is translated into a linear movement of the end of the lever, namely a movement to the right or left side in FIG. 4 depending on the rotation direction.

The end of the spindle nut 440 opposite to the second motor 220 is supported by the lever 250, as can be seen in FIG. 4. On the other side of the lever 250, a spring 413 is located which exerts a spring force against the lever 250 so that the spindle nut 440 and the lever 250 are pressed against each other to reduce play. Therefore, the spring 413 couples the mounting unit, i.e. the frame 411, to the adjusting unit, i.e. the lever 250.

The position of the spindle nut 440, and thus also of the lever 250, is detected by a position detector 414, such as a photo sensor, and an indicator 480, such as a needle, wherein the position detector 414 is fixed to the frame 411 and the indicator 480 is fixed to the spindle nut 440. Alternatively, the indicator 480 may also be directly connected to the lever 250 to detect movement of the lever.

Figure 9A:
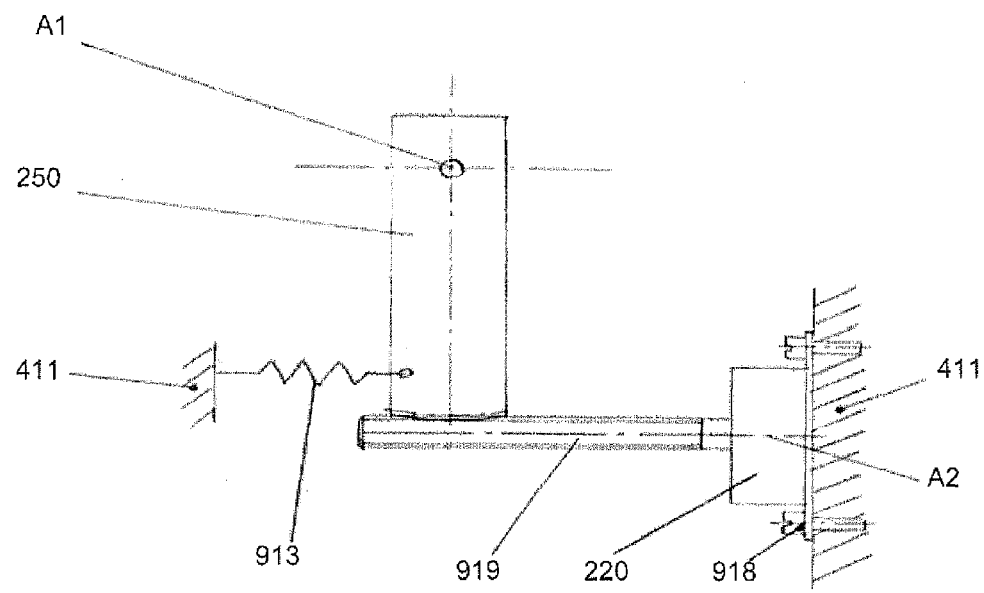
FIGS. 9A and 9B illustrate different examples of the configuration of the adjusting unit.
Figure 9B:
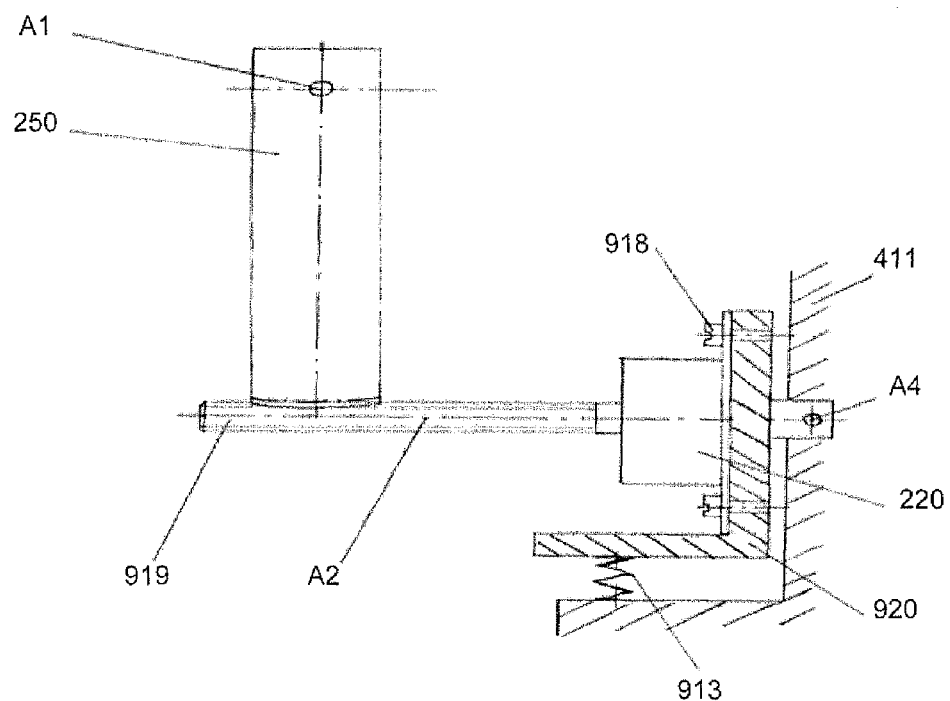

It is appreciated that the motor drive apparatus of FIG. 4 is not limited to a spindle drive, and other suitable mechanical arrangements capable of translating a rotational movement of the rotor of the second motor 220 into a linear movement, are possible which is for example shown in FIGS. 9A and 9B.

According to the above discussion with respect to FIGS. 1 and 2, the first motor 210 is used for coarse mode operation, in which the instrument axis A3 is rotated with high angular velocity. On the other hand, the accuracy of positioning the instrument axis A3, i.e. precisely rotating the instrument axis A3 to a certain angle, is limited to the size of the step positions of the first motor 210 and the gear transmission ratio provided by the gear wheel 270 and pinion gear 510. Since this accuracy may not be sufficient for operations of a surveying instrument, the motor drive apparatus 400 comprises the pivotably mounted stator of the first motor 210, which can be rotated by the second motor 220.

In detail, the rotary motion of the second motor 220 may be imparted via the spindle drive 430, 440, the lever 250 and the stator 516 on the rotor of the first motor 210 due to the holding torque between the stator and the rotor of the first motor 210, and thus the instrument axis A3 may be rotated finely. Therefore, fine adjustment of the instrument axis A3 can be achieved at a scale sufficient for surveying instruments. In other words, the lever 250 may apply a torque to the stator of the first motor to rotate the stator by a small degree.

In this example, the adjusting unit basically comprises the spindle drive, lever 250 and second motor 220 to rotate the stator of the first motor 210 in a limited angular range. The angular range is basically defined by the adjustment range of the spindle drive 430, 440, and the position of the spindle nut 440 or the lever 250 is constantly monitored by the position detector 414 and the indicator 480.

As shown in FIG. 4, the threaded spindle 430 extends essentially in an axial direction coinciding with the rotation axis of the second motor 220, and thus by rotating the threaded spindle in one direction, the lower end of the lever 250 may be pulled toward the second motor 220, essentially by the force of the spring 413, and by rotating in the reverse direction, the lower end of the lever 250 can be pushed away from the second motor 220.

As shown and described with respect to FIGS. 2 and 4, the lever is fixed to the stator of the first motor and by pushing the lower portion of the lever at the location of the spring by means of the second motor, the lever rotates the stator of the first motor. This makes it possible that the lever 250 causes a fine adjustment of the stator. Advantageously, due to an optional holding torque between the rotor and the stator of the first motor 210, the rotor is also rotated when the stator is rotated so that fine adjustment of the instrument axis may be caused without driving the first motor.

A control unit, not shown, of the motor drive apparatus 400 controls the movements of the first and second motors. Specifically, the first and second motors 210 and 220 are controlled in such a way that the spindle nut 440 or the lever 250 are moved in a middle position, e.g. a middle position of the adjustment range on the threaded spindle which basically corresponds to a middle position of the angular range so that the stator of the first motor 210 may be rotated either in clockwise or counter clockwise direction.

For example, when the rotor of the first motor rotates to a certain position, the stator of the first motor can be rotated in the reverse direction so that the lever 250 comes to the middle position. Alternatively, when the stator of the first motor is rotated so as to position the lever 250 in a middle position, the rotor of the first motor 210 may be rotated in a reverse direction so that the position of the instrument axis basically remains the same. Rotating the stator relative to the rotor is usually performed in the coarse mode, wherein in the fine mode, the rotor and the stator of the first motor are kept in the same position relative to each other. As a result, the adjustment range having limits of displacement of the lever 250 may be used efficiently.

As mentioned above, FIG. 5 illustrates a cross section of the motor drive apparatus 400. The cross section A-A comprises the rotation axis A1 and the instrument axis A3, which can also be seen in FIG. 6. The first motor 210 is pivotably mounted by means of suitable bearings 509, e.g. ball bearings or slide bearings, around the rotation axis A1 on the frame 411. The pinion gear 510 engages with the gear wheel 270. Furthermore, a gear wheel 517 may be coupled to gear wheel 270 so that by means of spring forces acting tangentially in opposite directions on the gear wheels, freedom from play of the spur gear may be obtained. Rotation of the instrument axis A3 causes the telescope body 511 to rotate.

On the other hand, in FIG. 6, a cross section of the motor drive apparatus 400 along B-B perpendicular to the rotation axis A1 and parallel to the rotator axis A2 is illustrated. Here, the second motor 220 is mounted to the frame 411 by bolts, including a bolt 618 so that the stator 422 cannot rotate around the rotor axis A2 with respect to the frame 411.

In summary, the elements of the motor drive apparatus of FIGS. 4 to 6 are arranged to be controlled by the control unit as follows.

The control unit may drive the first motor in a coarse mode by rotating the rotor relative to the stator to adjust a coarse angle of the instrument axis and may drive the second motor in a fine mode by rotating the stator of the first motor around the rotation axis to adjust a fine angle of the instrument axis. Specifically, the control unit may first drive the first motor to rotate the rotor by a first angle to a first position to adjust the coarse angle of the instrument axis and then may drive the second motor to rotate the stator of the first motor by a second angle to a second position to adjust the fine angle of the instrument axis, wherein the first angle is larger than the second angle. Additionally, the accuracy of adjusting an angle of the instrument axis, i.e. the angular resolution, may further depend on the transmission ratios provided by the arrangement and size of the lever 250 and the gear wheel 270.

In the following, a motor drive apparatus similar to the one previously described is discussed with respect to FIGS. 7 and 8.

Figure 7:
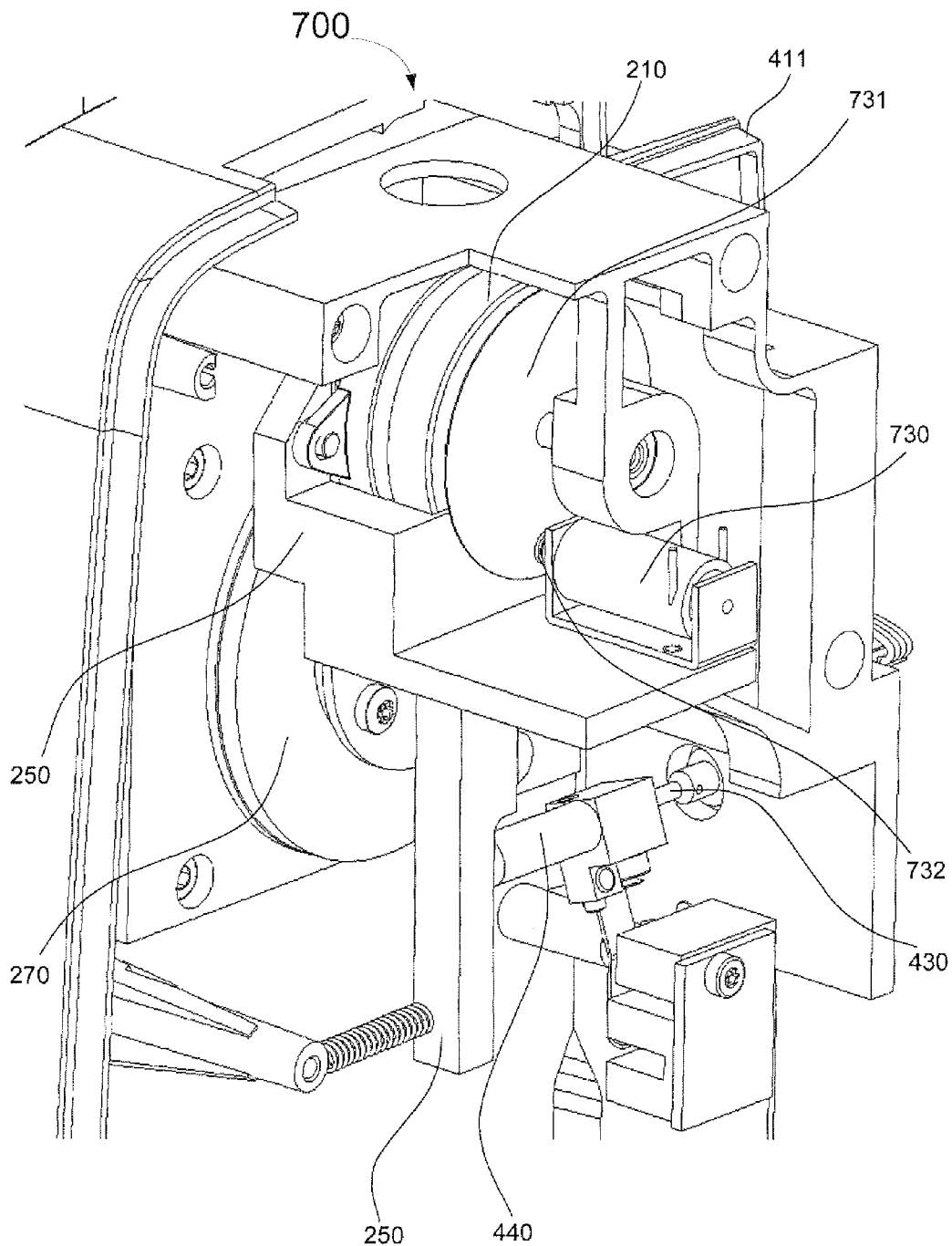
FIG. 7 illustrates a detailed perspective view of a motor drive apparatus comprising a magnet according to another embodiment of the invention.
Figure 8:
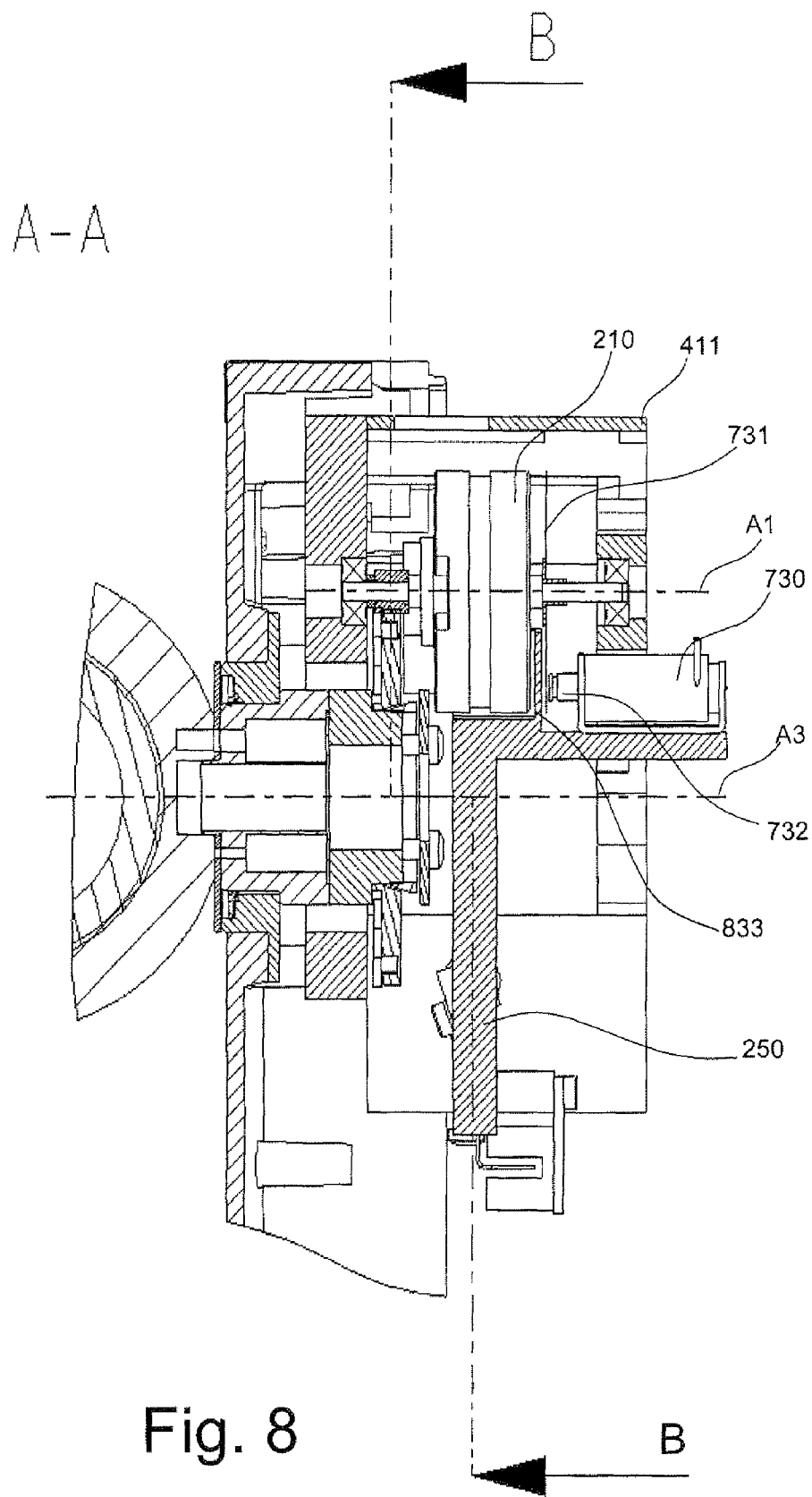
FIG. 8 illustrates a cross-sectional view taken along a plane parallel to the instrument axis and rotation axis of the motor drive apparatus of FIG. 7.

FIG. 7 illustrates a detailed perspective view of a motor drive apparatus 700 comprising a magnet and FIG. 8 illustrates the same motor drive apparatus in a cross-sectional view taken along a plane parallel to the instrument axis A3 and the rotation axis A1.

In addition to the elements of the motor drive apparatus 400 of FIGS. 4 to 6, the motor drive apparatus 700 of FIG. 7 also comprises a magnet 730 with an anchor 732 and a disk 731.

The magnet 730 is attached to the lever 250 to apply a breaking force to the first motor 210 to lock the rotor of the first motor to the lever 250. In this example, the breaking force may be applied to the rotation axis of the first motor 210, to which the disk 731 is attached by pressing the disk against the lever part 833 shown in FIG. 8. The magnet 730 may be a bistable magnet and the breaking force may be applied mechanically by the anchor 732 of the bistable magnet 730.

Using a bistable magnet as magnet 730 may be advantageous in that the anchor 732 may be pulled in the magnet, when a first current pulse of a first polarity is applied (the bistable magnet comprises the anchor and a permanent magnet placed in a line with the anchor) and the anchor 732 may be pushed out if a second current pulse with a second polarity is applied, wherein the anchor 732 may be released from the permanent magnet with the help of a spring, not shown. Alternatively, it is also possible to use a conventional electromagnet, which however would consume energy in one of the states.

In operation, if motor 220 is activated for fine mode operation, the anchor 732 is pushed out of the magnet 730 and the anchor 732 presses the disk 731 attached to the rotation axis A1 onto the lever part 833. Consequently, the first motor 210 is clamped and the rotor cannot move relative to the stator so that the first motor may also be switched off. If a bistable magnet 730 is used, also this magnet may be switched off and the second motor 220 may move the lever 250 via the spindle drive comprising the threaded spindle and the spindle nut. The lever 250 may then rotate the stator of the first motor 210 which directly leads to a rotation of the rotor of the first motor. It is noted that the magnet 730 and the lever part 833 are attached or part of the lever 250 so that the first motor 210 may be turned by the second motor 220, and the first motor is tightly clamped to the lever 250. Accordingly, the magnet 730 constitutes an electromagnetic clamp.

Therefore, even if the holding torque of a stepper motor as first motor 210 or any other motor is not sufficient and when the lever 250 is moved and there should be relative movement between the rotor and the stator of the first motor, the motor drive apparatus may still be operated as discussed above by using the electromagnetic clamp.

Alternatively to mechanically applying a breaking force by an anchor, it is feasible to induce with some kind of electromagnet a strong magnetic field in the rotor of the first motor so that the holding torque may increase.

As described above, the motor drive apparatus 400 is not limited to a spindle drive as discussed above and other suitable mechanical arrangements may be used. Alternative arrangements using worm gears for finely moving the lever 250 are shown with respect to FIGS. 9A and 9B.

In FIG. 9A the threaded spindle is replaced by a worm gear. The second motor 220 is attached to the frame 411 by bolts 918. The rotor of the second motor 220 is adapted to constitute a worm 919. The lever 250 engages with its lower end, which is shaped like a worm gear, with the worm 919. Play between the worm and the worm gear may be eliminated by means of a spring 913 coupled to the frame 411, which may have a similar function as the spring 413 previously described. Therefore, a rotation of the rotor of the second motor translates in a movement around the axis A1 so that the stator of the first motor in the motor drive apparatus 400 may be moved.

In FIG. 9B also a worm gear replaces the spindle drive of FIG. 4. The second motor 220 is mounted to a motor support 920 by bolts 918. The motor support 920 is turnably coupled by joint A4 to the frame 411. The rotor of the second motor 220 may again be adapted to constitute a worm 919, with which the lower part of the lever 250 engages. In this example, play between the worm 919 and the lever 250 may be eliminated with the spring 913, which connects the motor support 920 with the frame 411.

In the above description, several different embodiments of motor drive apparatuses have been described. Such a motor drive apparatus may be integrated in a surveying instrument for rotating an instrument axis of the surveying instrument. Furthermore, if it is desired to rotate the head of a surveying instrument in two directions, namely in horizontal and vertical direction, two motor drive apparatuses, such as the ones discussed above, may be integrated in the surveying instrument so that the first motor drive apparatus may rotate a horizontal instrument axis and the second motor drive apparatus may rotate a vertical instrument axis.

As previously mentioned, the motor drive apparatuses have to adjust instrument axes accurately and quickly to position an optical arrangement, such as a telescope 511, to exactly point to an object to be measured. For example, it is desirable to position the optical arrangement with respect to a vertical and a horizontal angle in short time to an accuracy below one angular second (1").

In the following, specific examples of the control of the motors of one or two motor drive apparatuses in a surveying instrument will be described.

Figure 10:
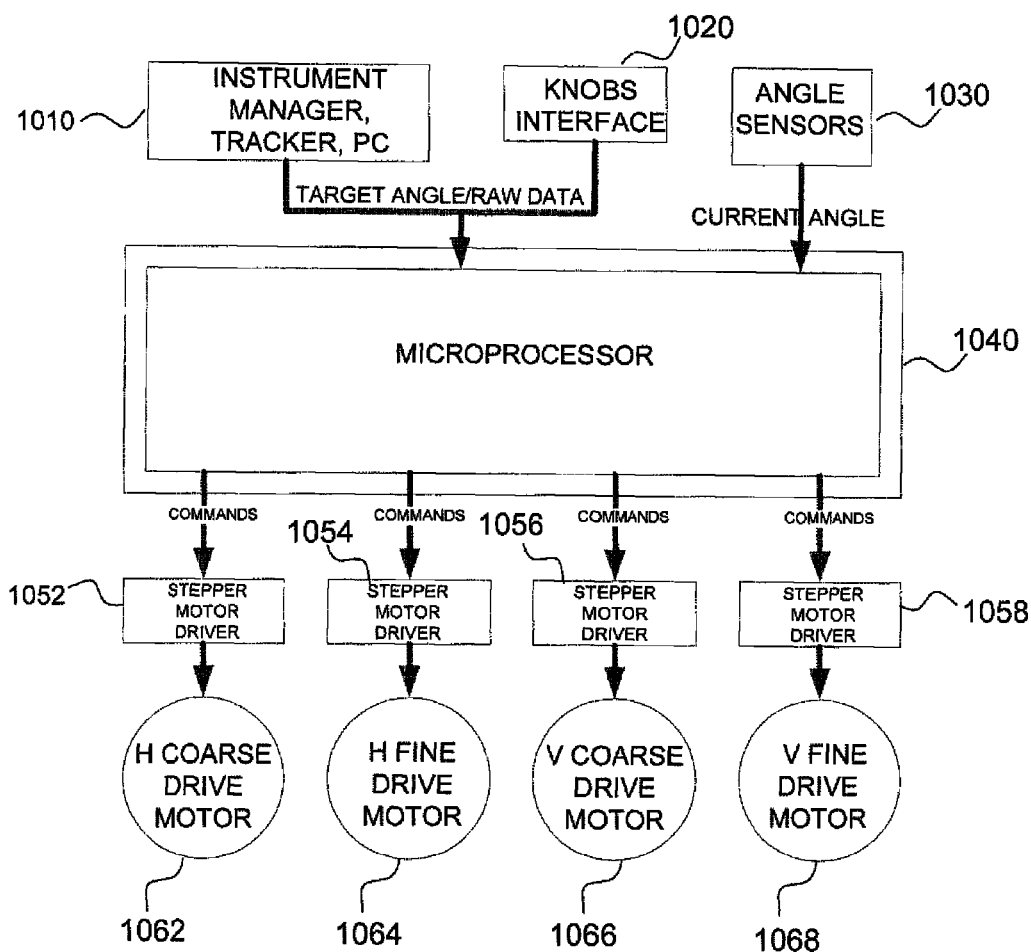
FIG. 10 illustrates the flow of information to the control unit for controlling the motors.

FIG. 10 illustrates the flow of information to and from the control unit of the motor drive apparatus or the surveying instrument for controlling the motors.

In the following, it will be assumed that the control unit of the motor drive apparatus is the same control unit as the one of the surveying instrument. However, it is readily apparent that also different control units may be used to control the specific functions, for example the functions of the motor drive apparatus and other surveying and data measurement functions of the surveying instrument.

As control unit, a microprocessor 1040 is used obtaining current angle data from vertical and horizontal angle sensors 1030 via a serial interface. Target angle data may be received from an instrument manager, tracker that supports automatic tracking of an object or an application running on an externally connected PC 1010. Data from operation knobs 1020 may also be received by the control unit and may be taken into account when determining a target angle.

In the microprocessor 1040 the received angles are analyzed and the coordination for driving the motors is performed. For example, as shown in FIG. 10, four stepper motors 1062, 1064, 1066 and 1068 may be used connected in signal communication with stepper motor drivers 1052, 1054, 1056 and 1058. Specifically for horizontal movement, a coarse drive motor 1062 (first motor) and a fine drive motor 1064 (second motor) are used and for vertical movement a coarse drive motor 1066 (first motor) and a fine drive motor 1068 (second motor) are used, wherein horizontal is indicated by H and vertical is indicated by V in FIG. 10.

The commands to the stepper motor drivers may be sent via parallel interfaces. Additionally, which is not shown in FIG. 10, each one, the horizontal motor drive apparatus and the vertical motor drive apparatus may comprise a magnet, such as magnet 730 discussed above, which can be deactivated to allow coarse movement when the coarse drive motor is in operation. When the coarse drive motor is not in operation, the coarse drive motor may be clamped by the magnet and may be switched off.

Figure 11A:
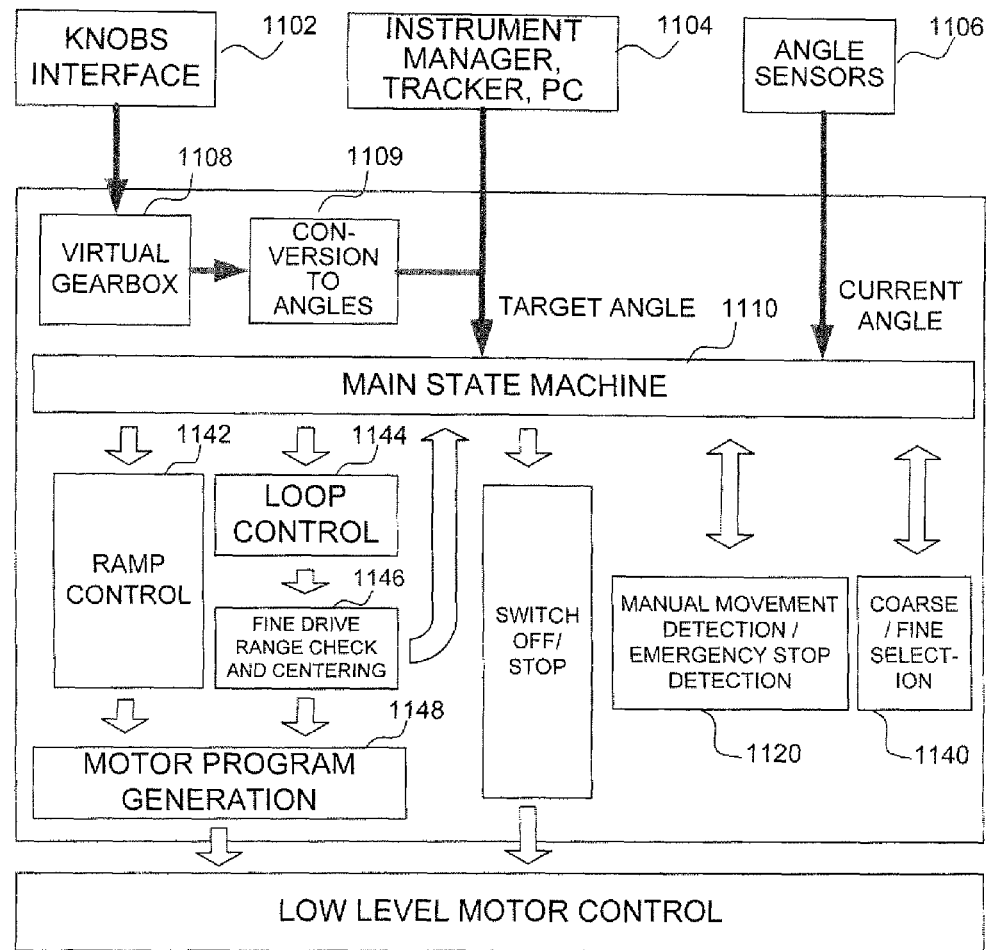
FIG. 11A illustrates a configuration of an operation program of the control unit.

In FIG. 11A, a configuration of an operation program of the control unit is illustrated. Data from operation knobs 1102 are received by the digital gear box 1108 and scaled depending on the turning speed at the knobs so that the instrument turns faster or slower depending on the knob operation. The data is then converted in corresponding target angle values in 1109 and target angles are then input to the main state machine 1110 by taking into account the output from instrument manager, tracker and/or PC 1104, as can be seen in FIG. 11A. Current angles are received by the main state machine 1110 from angle sensors 1106. The main state machine communicates with peripheral devices, initializes program routines and decides on the current operation mode.

Manual movement detection/Emergency stop detection 1120 monitors angle values and the position of the lever or spindle nut in fine mode and monitors current angle values in all operation modes and switches off the motors, indicated by "stop", if a deviation between estimated and current angle values is too large. The estimated angle is computed from the current angle and an actual movement to reach the target angle. Accordingly, strain and stress to the mechanical components of the instrument and possible damage can be avoided. If someone tries to turn the head of the surveying instrument by hand, this may be detected by manual movement detection using certain thresholds, and the electromagnetic clamp, i.e. the magnet 730 and the drives, are released so that the instrument may be freely rotated around its axes.

The coarse/fine selection 1140 determines according to the operation mode which one of the motors has to be controlled, i.e. the coarse drive motors or fine drive motors. As described above, if fast rotation and thus large angles are desired, coarse mode will be used and the motor is controlled and driven according to a calculated pattern "ramp control" 1142, which may be reprogrammed while in rotation. The electromagnetic clamp is released in coarse mode.

If smaller angles for keeping a certain position are desired, the fine mode is selected. The program may work with feedback control, for example with a digital PID-controller "loop control" 1144 and the electromagnetic clamp is active in the fine mode. Additionally, the position of the lever or spindle nut can be monitored, "fine drive range check and centering" 1146 as described above.

If the spindle nut reaches the end of the threaded spindle, centering of the lever 250, i.e. moving the lever 250 in the middle position, is performed, as described above with respect to FIGS. 4 to 6. The motor program generation 1148 generates the motor program and motor control 1150 is performed.

Figure 11B:
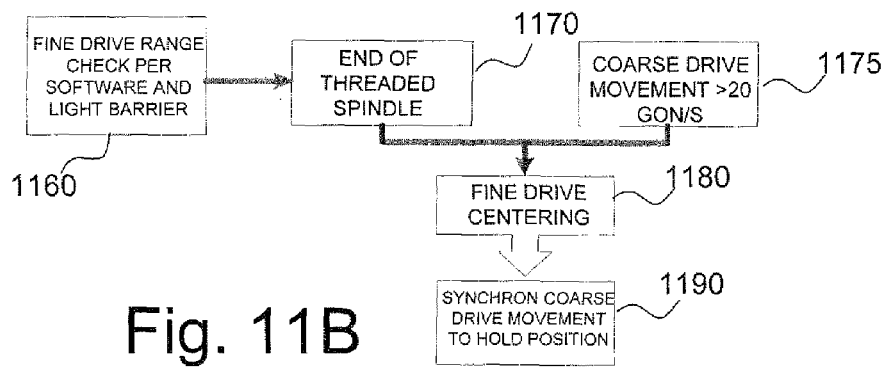
FIG. 11B illustrates resetting in the fine mode.

FIG. 11B describes the fine drive centering in more detail so that the user does not reach any displacement limits of the lever 250.

As described above, in fine mode, the position of the spindle nut on the threaded spindle is constantly checked by software, e.g. by calculating step counts of the motor, and by a photo sensor, such as a light barrier in operation 1160. It is understood that instead of the spindle nut other moving parts may be used to detect displacement of the lever, for example a cam follower may be monitored or other parts of the lever.

Fine drive centering, i.e. moving the spindle nut back to the middle position on the threaded spindle, is effected, in the example of FIG. 11B, by two conditions. Firstly, when reaching a displacement limit, i.e. the end of the threaded spindle in operation 1170, and secondly, when rotating the instrument with more than for example 20 gon/s, as shown in operation 1175, so that in subsequent sighting of an object the middle position is reached and the user may operate in fine mode to optimize the sighting of the object.

While performing fine drive centering in operation 1180, the coarse drive motor essentially rotates the same angular amount in the opposite direction so that the fine drive centering is not noticed by the user. Therefore, the rotation in the opposite direction of the coarse drive motor is synchronized with the rotation of the fine drive motor and the electromagnetic clamp is released in operation 1190. Alternatively to holding the position in 1190 the angular speed may be kept constant.

Figure 12:
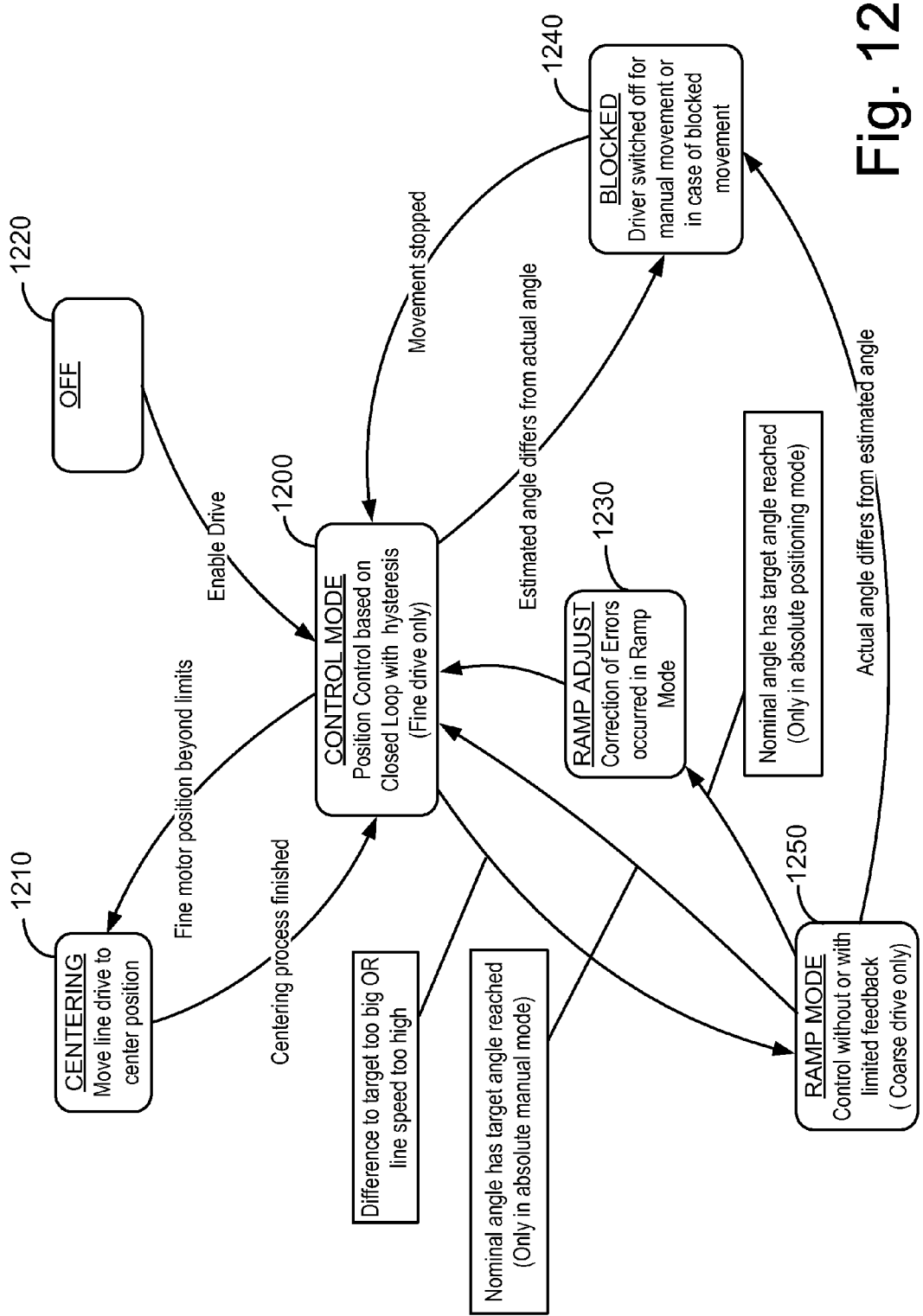
FIG. 12 illustrates control procedures in different modes.

In the following, a specific example for controlling fine and coarse mode will be described with respect to FIG. 12. In FIG. 12 control procedures are illustrated.

The control mode 1200 is activated by an enable signal from block 1220. If the fine drive motor position is beyond the limits, centering in block 1210 is performed to move a fine drive to center position and a centering process finish signal is returned to control mode block 1200. If a difference to a target angle is too large or the speed in fine mode too high, ramp mode may be used in block 1250 to switch in the coarse mode and the ramp may be adjusted in block 1230 if a nominal angle has reached a target angle.

If the estimated angle differs from actual angle, operation may be stopped and the motors or drives switched off for manual movement or in case of a blocked movement, which is indicated by "blocked" in block 1240 and a corresponding movement stopped signal is returned to the control mode block 1200.

As described above, the control unit may be realized by a microprocessor. Alternatively, the control unit may be realized by a computer, field programmable gate array (FPGA) or integrated circuit, such as an ASIC (Application Specific Integrated Circuit) or software or any suitable combination of the above, but is not limited thereto. Further, the control unit may comprise or may be connected to a storage unit connected in signal communication with the microprocessor.

The functions of the control unit may be embodied as software program and may be realized by the microprocessor and a memory, such as the storage unit or any kind of RAM, ROM, hard disk, EEPROM, flash memory etc. A program code stored in the memory may be a program including instructions adapted to cause the microprocessor in the control unit to carry out the operations described above.

A program code stored in the memory may be a program including instructions adapted to cause the microprocessor in the control unit to carry out the operations of the surveying instrument described above.

In other words, a program may be provided including instructions adapted to cause a processor, such as the microprocessor of the control unit, to carry out combinations of the above described operations.

Moreover, a computer readable medium may be provided in which the program is embodied. The computer readable medium may be tangible, such as a disk or other data carrier, or may be intangible, constituted by signals suitable for electronic, optic or any other type of transmission. A computer program product may comprise the computer readable medium and when loaded into a program memory of a computer, processor or microcontroller causes the processor or microcontroller to carry out the above described operations.

As described above, the above embodiments and examples allow for fast rotation of an instrument axis with high angular resolution. Therefore, a motor drive apparatus may be useful for surveying instruments, in which fast and accurate positioning is desired.

It will be appreciated that various modifications and variations can be made in the described motor drive apparatuses and surveying instruments as well as methods without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the invention.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the foregoing disclosed implementation or configuration. Thus, the true scope and spirit of the invention is indicated by the following claims.

What is claimed is:

1. A motor drive apparatus for a surveying instrument, the motor drive apparatus comprising:
    a first motor for rotating an instrument axis, the first motor including a stator and a rotor having a rotation axis and a plurality of step positions relative to the stator;
    a mounting unit for mounting the first motor so as to be pivotable around the rotation axis; and
    an adjusting unit comprising an actuator for applying a torque to the stator, wherein the adjusting unit is coupled to the stator so as to rotate the first motor including the stator and the rotor around the rotation axis for fine adjustment of the instrument axis.

2. The motor drive apparatus of claim 1 wherein the adjusting unit comprises a lever coupled to the stator so that a movement of the lever translates into a rotation of the stator.

3. The motor drive apparatus of claim 2 wherein the adjusting unit comprises at least one of a spindle drive or a worm gear for coupling the actuator and the lever to move the lever.

4. The motor drive apparatus of claim 2 further comprising a magnet attached to the lever to apply a breaking force to the first motor to lock the first motor to the lever.

5. The motor drive apparatus of claim 4 wherein the magnet is a bistable magnet and the breaking force is applied mechanically by an anchor of the bistable magnet.

6. The motor drive apparatus of claim 2 further comprising a position detector for detecting the position of the lever.

7. The motor drive apparatus of claim 1 wherein the adjusting unit comprises an actuator for applying a torque to the stator.

8. The motor drive apparatus of claim 1 wherein the actuator comprises a second motor.

9. The motor drive apparatus of claim 8 wherein the second motor comprises a second stator and a second rotor, the second rotor having a plurality of step positions relative to the second stator.

10. The motor drive apparatus of claim 8 wherein the adjusting unit comprises at least one of a threaded spindle or a worm extending in an axial direction coinciding with the rotation axis of the second motor.

11. The motor drive apparatus of claim 8 wherein at least one of the first motor or the second motor is constituted by a stepper motor providing a holding torque between the rotor and the stator.

12. The motor drive apparatus of claim 1 further comprising a gear wheel coupled to the first motor for rotating the instrument axis by rotation of the first motor around the rotation axis.

13. The motor drive apparatus of claim 1 further comprising a spring coupling the mounting unit and the adjusting unit.

14. The motor drive apparatus of claim 1 further comprising a control unit adapted to drive the first motor and adjusting unit.

15. The motor drive apparatus of claim 14 wherein the control unit is adapted to drive the first motor in a coarse mode by rotating the rotor relative to the stator to adjust a coarse angle of the instrument axis and to drive the adjusting unit in a fine mode by rotating the stator around the rotation axis to adjust a fine angle of the instrument axis.

16. The motor drive apparatus of claim 15 wherein the control unit is adapted to first drive the first motor to rotate the rotor by a first angle to a first position to adjust the coarse angle of the instrument axis and then to drive the adjusting unit to rotate the stator of the first motor by a second angle to a second position to adjust the fine angle of the instrument axis, the first angle being larger than the second angle.

17. A surveying instrument comprising the motor drive apparatus of claim 1 for rotating an instrument axis of the surveying instrument.

18. A surveying instrument comprising two motor drive apparatuses of claim 1 wherein the first motor drive apparatus is adapted to rotate a horizontal instrument axis and the second motor drive apparatus is adapted to rotate a vertical instrument axis.

19. A method of controlling a surveying instrument, the method comprising:
    rotating an instrument axis of the surveying instrument by a first motor mounted so as to be pivotable around a rotation axis and including a stator and a rotor having the rotation axis and plurality of step positions relative to the stator to adjust a coarse angle of the instrument axis; and
    rotating the first motor including the stator and the rotor around the rotation axis to adjust a fine angle of the instrument axis by an adjusting unit comprising an actuator for applying a torque to the stator.

20. The method of claim 19 wherein:
    rotating the instrument axis comprises rotating the rotor relative to the stator in a coarse mode to adjust the coarse angle of the instrument axis; and
    rotating the stator around the rotation axis is performed in a fine mode to adjust the fine angle of the instrument axis.

21. The method of claim 20 wherein, in the coarse mode, the rotor of the first motor is first rotated by a first angle to a first position and then, in the fine mode, the stator of the first motor is rotated by a second angle to a second position, the first angle being larger than the second angle.

22. The method of claim 20 wherein, when the rotor of the first motor is rotated to a second position, the stator is rotated in a reverse direction to a third position.

23. The method of claim 20 wherein in the fine mode the rotor and the stator of the first rotor are kept in the same position relative to each other.

24. A program including instructions adapted to cause data processing means to carry out the method of at least one of claim 19.

25. A non-transitory computer readable storage medium comprising a plurality of computer readable instructions tangibly embodied on the computer readable storage medium, which, when executed by a computer execute the method of at least claim 19.

26. A computer program product comprising the non-transitory computer readable medium according to claim 25.

* * * * *